(12) United States Patent  (10) Patent No.: US 8,514,335 B2
Murakami et al.  (45) Date of Patent: Aug. 20, 2013

(54) TRANSCEIVER

(75) Inventors: Shinichi Murakami, Yokohama (JP);
Isao Hoda, Yokohama (JP); Takatoshi Shirosugi, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 546 days.

(21) Appl. No.: 12/766,955

(22) Filed: Apr. 26, 2010

(65) Prior Publication Data

US 2010/0297958 A1  Nov. 25, 2010

(30) Foreign Application Priority Data

May 19, 2009  (JP) ................................. 2009-120470

(51) Int. Cl.
*H04N 5/38* (2006.01)
*H04B 17/00* (2006.01)
*H04B 1/00* (2006.01)
*H04W 4/00* (2009.01)

(52) U.S. Cl.
USPC .............................. 348/723; 455/69; 370/329

(58) Field of Classification Search
USPC ..................... 348/723; 455/69, 67.11, 452.1, 455/452.3, 454; 370/329
See application file for complete search history.

(56) References Cited

U.S. PATENT DOCUMENTS

| 7,024,162 B2* | 4/2006 | Muthuswamy et al. ... 455/67.11 |
| 7,657,244 B2* | 2/2010 | Niu et al. ..................... 455/277.1 |
| 7,826,850 B2 | 11/2010 | Matoba et al. |
| 8,009,989 B1* | 8/2011 | Gerszberg et al. ............ 398/115 |
| 2008/0037665 A1 | 2/2008 | Maeki et al. |
| 2008/0108310 A1* | 5/2008 | Tong et al. ...................... 455/69 |
| 2008/0259854 A1* | 10/2008 | Sumasu ........................ 370/329 |
| 2012/0275499 A1* | 11/2012 | Anreddy et al. ............... 375/219 |

FOREIGN PATENT DOCUMENTS

| JP | 06-037762 | 2/1994 |
| JP | 09-008706 | 1/1997 |
| JP | 2002-335201 | 11/2002 |
| JP | 2003-069472 | 3/2003 |
| JP | 2006-094003 | 4/2006 |
| JP | 2007-235370 | 9/2007 |
| JP | 2007-318325 | 12/2007 |
| WO | WO 2008/111145 | 9/2008 |

OTHER PUBLICATIONS

JP Office Action for Japanese Application No. 2009-120470, issued on Dec. 11, 2012.

(Continued)

*Primary Examiner* — Michael Lee
(74) *Attorney, Agent, or Firm* — Antonelli, Terry, Stout & Kraus, LLP.

(57) ABSTRACT

The present invention provides a method for providing an optimal wireless communication method according to a change in a wireless communication environment. When the reception status is degraded while an HD stream signal, which uses a first wireless method, is transmitted and received, the method scans channels for which radar wave monitoring is not required and switches the transmission/reception to a second wireless method using free channel A. The method further scans channels for which radar wave monitoring is required and, if free channel B has a bandwidth wider than that of channel A is found, monitors channel B and if channel B is not used by a radar wave, switches the channel from channel A to channel B.

13 Claims, 8 Drawing Sheets

(56) References Cited

OTHER PUBLICATIONS

IEEE Standard for Information technology—Telecommunications and information exchange between systems—Local and metropolitan area networks—Specific requirements Part11: Wireless LAN Medium Access Control (MAC) and Physical Layer (PHY) Specifications, Amendment 5: Enhancements for Higher Throughput IEEE Std 802. 11n, 2009, p. 10.

* cited by examiner

FIG.10 ized as the IEEE802.11 standard has
TRANSCEIVER

INCORPORATION BY REFERENCE

The present application claims priority from Japanese application JP2009-120470 filed on May 19, 2009, the content of which is hereby incorporated by reference into this application.

BACKGROUND OF THE INVENTION

The present invention relates to a transceiver capable of wireless transmission using multiple wireless methods.

The speed of the wireless LAN (Local Area Network) method that is standardized as the IEEE802.11 standard has increased to the transmission speed of 100 Mbps or higher with the advent of IEEE802.11n. To increase the transmission speed, IEEE802.11n allows information to be transmitted in one of two frequency bands per channel: 20 MHz wide channel similar to that available in the existing standards IEEE802.11a/g and 40 MHz wide channel. In this wireless LAN method, two frequency bands, 2.4 GHz and 5 GHz, are available and, especially, many channels are available in the 5 GHz band without a wireless station license (in the description below, wireless communication using the 5 GHz band is called 5 GHz band wireless communication). The description above is included in "IEEE Standard for Information technology—Telecommunications and information exchange between systems—Local and metropolitan area networks—Specific requirements Part 11: Wireless LAN Medium Access Control(MAC) and Physical Layer(PHY) Specifications Amendment 5: Enhancements for Higher Throughput", IEEE Std 802,11n, 2009. In the 5 GHz band, many channels are used also by various types of radar systems, and IEEE802.11h stipulates that 60-second monitoring be performed before using the channels to confirm that radar waves are not being used.

Recently, attention has been paid to the wireless communication method, which uses the millimeter wave band, as a method for implementing the gigabit-class high-speed wireless communication (in the description below, a wireless communication using the millimeter wave band is called a millimeter wave band wireless communication). For example, in Japan, the Ministry of Internal Affairs and Communications allocates a frequency band as wide as 7 GHz, from 59 GHz to 66 GHz, to this wireless communication without wireless station licenses, and study has been conducted on its application.

On the other hand, JP-A-9-8706 discloses a method in which two wireless transmission/reception systems are provided where the line deterioration status is checked and, upon detecting line deterioration, the wireless transmission/reception system is switched from one system to another.

SUMMARY OF THE INVENTION

A system has been developed for use in a digital television etc., in which the broadcast reception unit for receiving the broadcast wave and the display for displaying videos are separated. In this system, to wirelessly transmit a large capacity of several-Gbps HD (High Definition) stream signals as video data from the broadcast reception unit to the display, the millimeter wave band wireless communication capable of high-speed transmission is considered suitable.

However, because the electric wave in the millimeter wave band has an extremely strong tendency to go in straight lines in the millimeter wave band wireless communication, the drawback is that the transmittable range becomes shorter; for example, the communication is blocked in a place where there is an obstacle object between the transmitting device and the receiving device.

In contrast, in the 5 GHz band wireless communication, the electric wave in the 5 GHz band has a weaker tendency to go in straight lines than the electric wave in the millimeter wave band, the transmittable range is longer than in the millimeter wave band wireless communication and, so, the communication is performed more stably.

One possible solution to this problem is disclosed in JP-A-9-8706 in which the millimeter wave band wireless communication is switched to the 5 GHz band wireless communication if the communication status is degraded.

However, some channels used in the 5 GHz band wireless communication are used also by various types of radar systems and so there is a danger that channel interference will occur.

In addition, because the transmission capacity of the 5 GHz band wireless communication is about a little larger than 100 Mbps, the capacity is too small to transmit a large-capacity HD stream. An attempt to transmit a large-capacity HD stream would require reduction in the information amount, causing the problems such as video and voice degradation and transmission delay.

In view of the foregoing, it is an object of the present invention to provide a wireless transceiver capable of using multiple wireless methods at the same time for minimizing the above described problems involved in the millimeter wave band wireless communication and 5 GHz band wireless communication.

To achieve the above object, the present invention provides a transceiver comprising a transmission device that comprises a first transmission unit that transmits video data in a first frequency band; a second transmission unit that transmits video data over a second frequency bandwidth smaller in transmission capacity, and wider in transmission range, than the first frequency band; and a transmission side control unit that controls the first and second transmission units, and a reception device that comprises a first reception unit that receives video data transmitted by the first transmission unit; a second reception unit that receives video data transmitted by the second transmission unit; and a reception side control unit that controls the first and second reception units wherein, if it is detected that a reception quality of video data received by the first reception unit is degraded below a predetermined threshold while video data is transmitted and received in the first frequency band, the reception side control unit notifies control information, which indicates the degradation, to the transmission side control unit, the transmission side control unit detects a frequency bandwidth usable by the second transmission unit based on the control information which indicates the degradation and, when a usable frequency bandwidth is determined, causes the second transmission unit to transmit video data over the determined frequency bandwidth and, at the same time, notifies control information, which indicates the determined frequency bandwidth, to the reception side control unit, and the reception side control unit causes the second reception unit to receive video data based on control information which indicates the determined frequency bandwidth.

In addition, in the transceiver described above, if there are a plurality of frequency bandwidths usable by the second transmission unit and if at least two transmission capacities differ, the transmission side control unit determines a frequency bandwidth with a larger transmission capacity as a usable frequency bandwidth.

In addition, in the transceiver described above, the transmission side control unit stops the transmission operation of the first transmission unit when causing the second transmission unit to transmit video data and the reception side control unit stops the reception operation of the first reception unit when causing the second reception unit to receive video data.

Another invention is a transceiver comprising a transmission device that comprises a first transmission unit that transmits video data in a first frequency band; a second transmission unit that transmits video data over a second frequency bandwidth smaller in transmission capacity, and wider in transmission range, than the first frequency band; and a transmission side control unit that controls the first and second transmission units, and a reception device that comprises a first reception unit that receives video data transmitted by the first transmission unit; a second reception unit that receives video data transmitted by the second transmission unit; and a reception side control unit that controls the first and second reception units wherein, when video data is transmitted and received in the second frequency band and a. predetermined condition is satisfied, the reception side control unit checks a reception quality of video data transmitted by the first transmission unit and received by the first reception unit and, if it is detected that the reception quality is improved to a predetermined threshold or higher, notifies control information to the transmission side control unit to stop the transmission by the second transmission unit and, at the same time, stops the reception of video data by the second reception unit, and the transmission side control unit stops the transmission of video data by the second transmission unit based on the notified control information.

In the transceiver described above, an example in which the predetermined condition is satisfied is when the reception side control unit detects a change in the reception quality of video data received by the second reception unit.

In the transceiver described above and in a configuration in which the reception device is included in a display device, on which received video data is displayed, and is connected to a motion detection device, the motion detection device being included in the display device for detecting a motion of the display device, an example in which the predetermined condition is satisfied is when the reception side control unit receives a notification, which indicates that the display device is moved, from the motion detection device.

In the transceiver described above, an example in which the predetermined condition is satisfied is when a predetermined time has elapsed.

When the wireless communication is switched from the millimeter wave band wireless communication, whose communication status is degraded, to the 5 GHz band wireless communication, the present invention described above detects whether a channel shared in the 5 GHz band is usable, thus preventing interference with other systems.

In addition, in the 5 GHz band wireless communication where 20 MHz wide channels and 40 MHz wide channels are used, the present invention allows 40 MHz wide channels, which have a larger transmission capacity, to be used by priority.

In addition, when the wireless communication is switched to the 5 GHz band wireless communication, the present invention stops the millimeter wave band wireless communication to reduce power consumption.

According to another invention, if the communication status of the millimeter wave band wireless communication is improved, the 5 GHz band wireless communication is stopped and the wireless communication is returned quickly to the millimeter wave band wireless communication.

Other objects, features and advantages of the invention will become apparent from the following description of the embodiments of the invention taken in conjunction with the accompanying drawings.

DESCRIPTION OF THE EMBODIMENTS

Embodiments of the present invention will be described in detail with reference to the drawings.

In the description of the embodiments of the present invention, an example of the wireless transmission of an HD stream signal is described using a wireless transceiver that has two wireless communication functions, 5 GHz band wireless communication and the millimeter wave band wireless communication both of which are used primarily for a wireless LAN.

Figure 1:
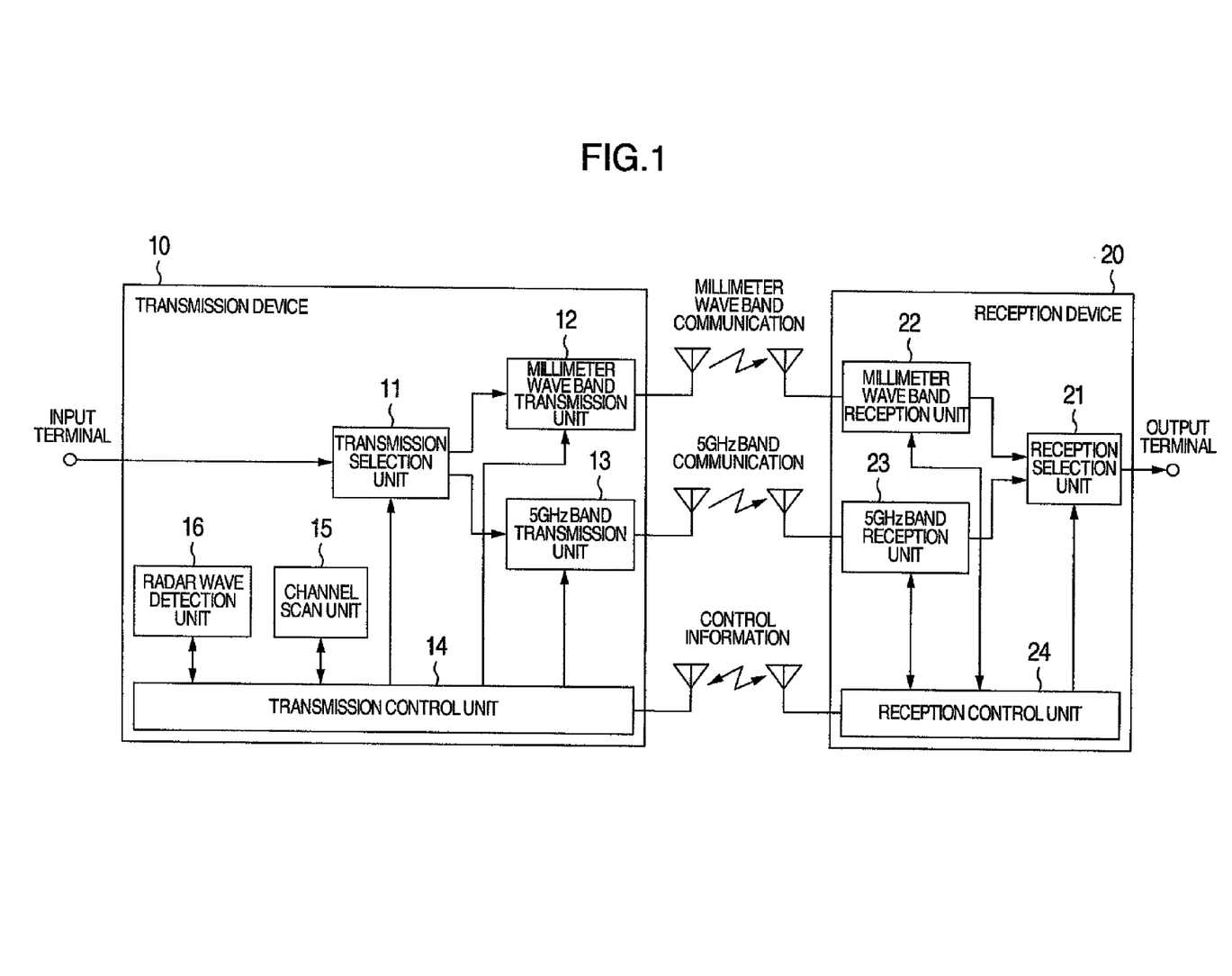
FIG. 1 is a block diagram showing the configuration of a wireless transceiver in a first embodiment of the present invention.

<First Embodiment>FIG. 1 is a block diagram showing the configuration of a wireless transceiver in a first embodiment of the present invention.

Referring to FIG. 1, a transmission device 10 that functions as the HD stream signal transmitting side comprises a transmission selection unit 11, a millimeter wave band transmission unit 12, a 5 GHz band transmission unit 13, a transmission control unit 14, a channel scan unit 15, and a radar wave detection unit 16.

The transmission selection unit 11 receives, via the input terminal, an HD stream signal output from a broadcast reception device that receives a broadcast wave, a playback device such as a DVD (Digital Versatile Disk) or a BD (Blu-ray Disk), and a storage device such as an HDD (Hard Disk Drive). The transmission selection unit 11 supplies the received HD stream signal to either the millimeter wave band transmission unit 12 or the 5 GHz band transmission unit 13 or, in some cases, to both of them according to an instruction from the transmission control unit 14. The millimeter wave band transmission unit 12 transmits the HD stream signal, supplied by the transmission selection unit 11, to a reception device 20 using the millimeter wave band. The 5 GHz band transmission unit 13 performs operation, such as compression or information extraction, for the HD stream signal supplied from the transmission selection unit 11 so that the signal amount becomes a transmission capacity suitable for the 5 GHz band wireless communication, and transmits the signal to the reception device 20 using the 5 GHz band. The transmission control unit 14 controls the general operation of the transmission device 10 and, at the same time, transmits and receives various types of control information, such as the tuning channel information and the switching time information, to and from the reception control unit 24.

For the transmission and reception of control information, the 2.4 GHz band that does not require a wireless station license or the frequency of 38 kHz used by an infrared remote control may be used. It is desirable that control information be transmitted or received continuously even under poor condition in which the information cannot be transmitted or received via the millimeter wave band wireless communication or 5 GHz band wireless communication. The channel scan unit 15 scans a channel, specified by the transmission control unit 14, to see if the channel is being used by a neighboring apparatus and notifies the scanning check result to the transmission control unit 14. The radar wave detection unit 16 monitors a channel, specified by the transmission control unit 14, to see if the radar wave is being transmitted via the channel and notifies the monitoring check result to the transmission control unit 14.

On the other hand, the reception device 20, which functions as the HD stream signal receiving side, comprises a reception selection unit 21, a millimeter wave band reception unit 22, a 5GHz band reception unit 23, and a reception control unit 24. The millimeter wave band reception unit 22 receives the millimeter wave band electric wave, transmitted from the millimeter wave band transmission unit 12, supplies the received HD stream signal to the reception selection unit 21 and, at the same time, detects the reception quality value of the received HD stream signal and notifies the detection result to the reception control unit 24.

Here, the reception quality value is a value calculated, for example, from the reception signal synchronization status, AGC (Auto Gain Control), CNR (Carrier to Noise Ratio), MER (Modulation Error Ratio), or BER (Bit Error Rate). The 5 GHz band reception unit 23 receives the 5 GHz band electric wave, transmitted from the 5 GHz band transmission unit 13, performs operation, such as decompression or data supplementation, for the received HD stream signal, and supplies it to the reception selection unit 21.

The 5 GHz band reception unit 23 detects the reception quality value of the received HD stream signal and notifies the detected value to the reception control unit 24. Upon receiving an instruction from the reception control unit 24, the reception selection unit 21 selects the HD stream signal from one of the millimeter wave band reception unit 22 and the 5 GHz band reception unit 23 and supplies the selected HD stream signal to a video display device or an audio output device via the output terminal. The reception control unit 24 controls the general operation of the reception device 20 and, at the same time, transmits and receives various types of control information, such as the tuning channel information and the switching time information, to and from the transmission control unit 14.

The following describes an example of operation more in detail.

As the initial condition, assume that the wireless communication environment is good and that the non-compressed transmission of an HD stream signal is being performed between the transmission device 10 and the reception device 20 via the millimeter wave band wireless communication. Under this condition, the transmission control unit 14 causes the transmission selection unit 11 to supply the received HD stream signal to the millimeter wave band transmission unit 12 and, at the same time, causes the millimeter wave band transmission unit 12 to transmit the HD stream signal.

The reception control unit 24 causes the millimeter wave band reception unit 22 to start operation for receiving the millimeter wave band electric wave, transmitted from the millimeter wave band transmission unit 12, and at the same time causes the reception selection unit 21 to select the HD stream signal supplied from the millimeter wave band reception unit 22. This sequence of operation allows the HD stream signal to be transmitted and received between the transmission device 10 and the reception device 20 via the millimeter wave band wireless communication. To reduce the power consumption, it is desirable that the transmission control unit 14 stop the operation of the 5 GHz band transmission unit 13 and that the reception control unit 24 stop the operation of the 5 GHz band reception unit 23.

Next, when the wireless communication environment is changed for example, by the transmission device 10 or the reception device 20 that moves from one location to another and the signal cannot be transmitted or received via millimeter wave band wireless communication, the communication is switched from the millimeter wave band wireless communication to the 5 GHz band wireless communication in which the signal can be transmitted and received reliably.

Figure 2:
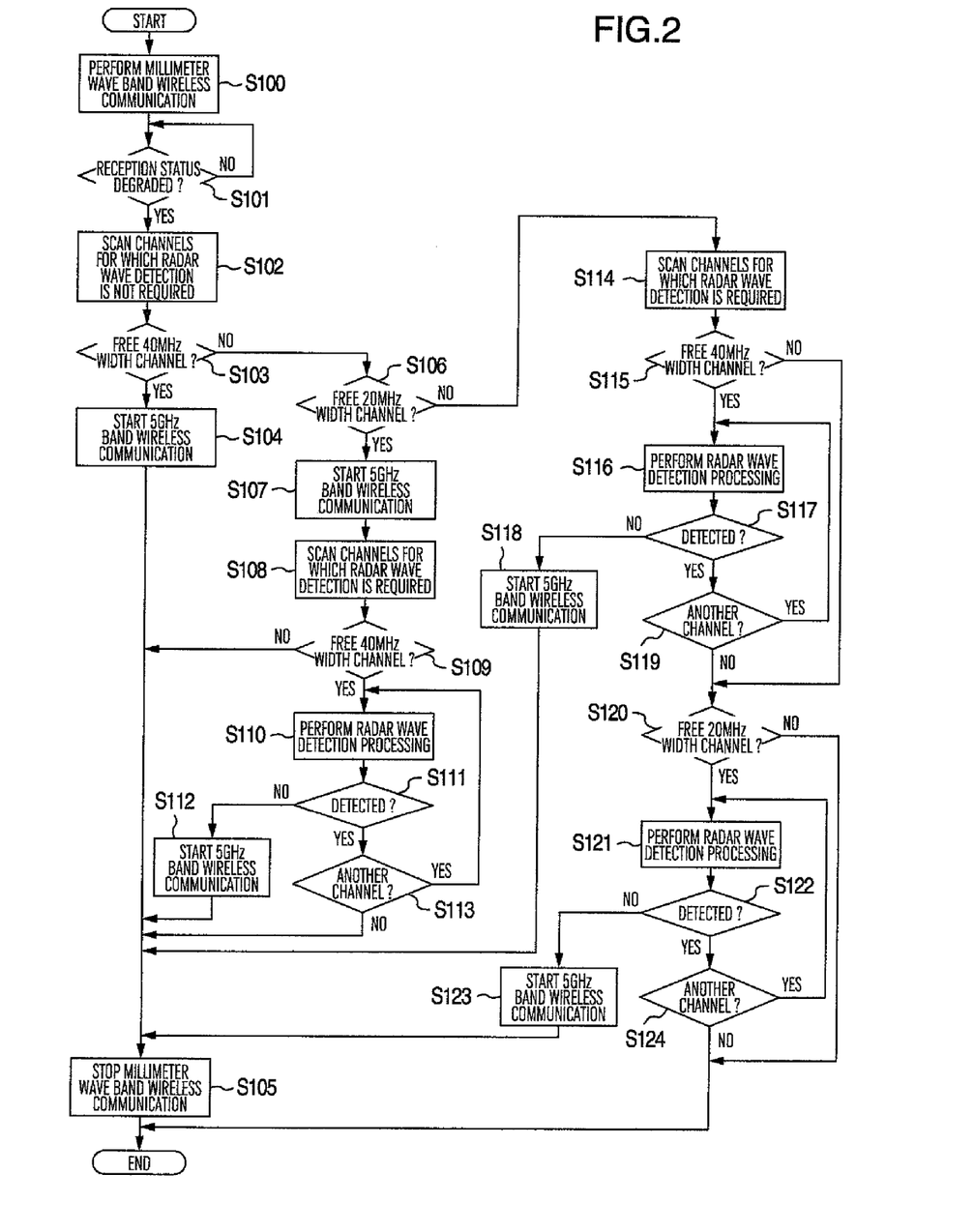
FIG. 2 is a flowchart showing an example of operation in which the millimeter wave band wireless communication is switched to the 5GHz band wireless communication in the first embodiment of the present invention.

The following describes the operation with reference to the flowchart shown in FIG. 2.

First, while the millimeter wave band wireless communication is being performed in step S100, the reception control unit 24 regularly acquires the reception quality value of the millimeter wave band wireless communication from the millimeter wave band reception unit 22 and compares the acquired reception quality value with a predetermined threshold.

It is supposed that the larger the reception quality value, the better the reception status and that the smaller the reception quality value, the poorer the reception status. If the reception quality value falls below the threshold, the reception control unit 24 judges that the reception status has degraded (YES in step S101), transmits the control signal to the transmission control unit 14 to indicate that the reception status of the millimeter wave band wireless communication has degraded, and passes control to step S102. In this case, if it is desired to prevent the control signal from being transmitted in the status in which the reception status is degraded only momentarily, for example, when a person walks between the transmission device 10 and the reception device 20, the reception control unit 24 may transmit the control signal to the transmission control unit 14 after the reception quality value falls below the threshold multiple times. By performing the operation described above, the transmission control unit 14 can recognize that the reception status of the millimeter wave band wireless communication in the reception device 20 has degraded.

When the transmission control unit 14 receives from the reception control unit 24 the control signal indicating that the reception status of the millimeter wave band wireless communication has degraded, the transmission control unit 14 causes the channel scan unit 15 to scan the channels in the 5 GHz band for which radar wave detection is not required and checks whether or not those channels are used by neighboring apparatuses (step S102).

Figure 3:
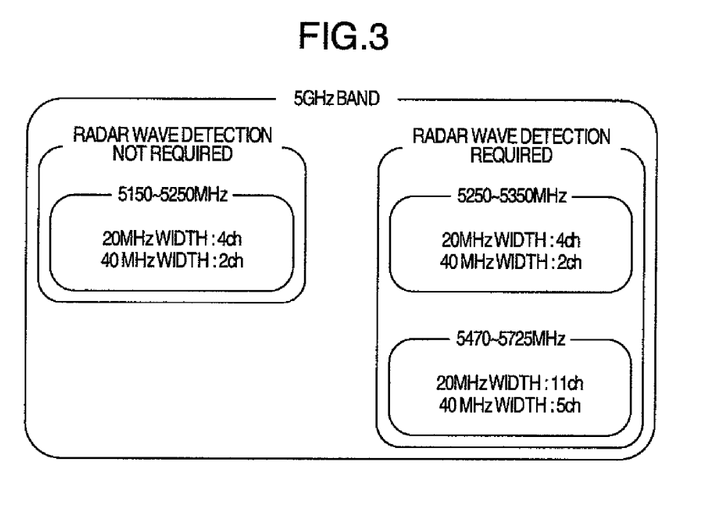
FIG. 3 is a showing a list of channels usable in the 5 GHz band.

More specifically, the channel scan unit 15 scans four 20 MHz wide channels and two 40 MHz wide channels in 5150 MHz-5250 MHz for which radar wave detection is not required, as shown in FIG. 3. If there is a free 40 MHz wide channel as a result of scanning (YES in step S103), the 5 GHz band wireless communication is started using that channel (step S104).

More specifically, the transmission control unit 14 causes the transmission selection unit 11 to supply the received HD stream signal to the 5 GHz band transmission unit 13 and, at the same time, causes the 5 GHz band transmission unit 13 to start the operation to transmit the HD stream signal via the 5 GHz band wireless communication.

In addition, the transmission control unit 14 transmits the 5 GHz-band transmission channel information to the reception control unit 24 and instructs it to switch the communication to the 5 GHz band wireless communication. When the transmission channel information is received, the reception control unit 24 causes the 5 GHz band reception unit 23 to start operation for receiving the electric wave via the 5 GHz band wireless communication and, at the same time, causes the reception selection unit 21 to select the HD stream signal supplied from the 5 GHz band reception unit 23.

The sequence of operation described above allows the communication to be switched quickly to the 5 GHz band wireless communication using the 40 MHz wide channel when the reception status of the millimeter wave band wireless communication is degraded. To reduce the power consumption, it is desirable that the transmission control unit 14 stop the operation of the millimeter wave band transmission unit 12 and that the reception control unit 24 stop the operation of the millimeter wave band reception unit 22 (step S105). Note that step S105 may be omitted.

On the other hand, if there is no free 40 MHz wide channel in step S103, control is passed to step S106. In step 106, a check is made if there is a free 20 MHz wide channel based on the scanning result in step S102 and, if there is such a channel, control is passed to step S107 to start the 5 GHz band wireless communication using the channel. This sequence of operations allows the communication to be switched quickly to the 5 GHz band wireless communication using the 20 MHz wide channel when the reception status of the millimeter wave band wireless communication is degraded. After step S107, the transmission control unit 14 causes the channel scan unit 15 to scan the channels in the 5 GHz band, for which radar wave detection is required, in step S108 and checks if those channels are being used by neighboring apparatuses. More specifically, the channel scan unit 15 scans seven 40 MHz wide channels and fifteen 20 MHz wide channels in 5250 MHz-5350 MHz and 5470 MHz-5725 MHz, for which radar wave detection is required, as shown in FIG. 3. If there is no free 40 MHz wide channel as a result of scanning (NO in step S109), the processing in step S105 described above is performed (this step may be omitted) and the 5 GHz band wireless communication, started in step S107, is continued using the 20 MHz wide channel.

If it is found in step S109 that there is a free 40 MHz wide channel, control is passed to step S110. In step 110, the radar wave detection processing is sequentially performed, one at a time, for the free 40 MHz wide channels detected in step S108.

More specifically, the transmission control unit 14 causes the radar wave detection unit 16 to monitor, for the duration of 60 seconds, if the radar wave is being transmitted on the cannel. If no radar wave is detected on the channel as a result of this monitoring (NO in step S111), the 40 MHz wide 5 GHz band wireless communication is started using the channel (step S112) and the processing in step S105 is performed (this step may be omitted).

This sequence of operations allows the 20 MHz wide 5 GHz band wireless communication, started in step S107, to be switched to the 40 MHz wide wireless communication that can transmit a higher capacity of information. If the radar wave is detected in step Sill, the channel cannot be used and so a check is made if there is another free 40 MHz wide channel for which the radar wave detection processing is required (step S113). And, if there is such a channel, control is passed back to step S110 to perform the radar wave detection processing for the channel. If there is no such channel in step S113, the processing in step S105 is performed (this step may be omitted) and the 20 MHz wide 5 GHz band wireless communication, started in step S107 described above, is continued.

On the other hand, if it is found in step S106 that there is no free 20 MHz wide channel for which radar wave detection is not required, control is passed to step S114. In step S114, the transmission control unit 14 causes the channel scan unit 15 to scan the channels, for which radar wave detection is required, as in step S108 and checks if those channels are being used by neighboring terminals. If there is no free 40 MHz wide channel as a result of scanning (NO in step S115), control is passed to step S120. If it is found in step S115 that there are free 40 MHz wide channels, control is passed to step S116. In step S116, the radar wave detection processing is sequentially performed, one at a time, for the free 40 MHz wide channels detected in step S114. If no radar wave is detected on the channel as a result of the 60-second monitoring (NO in step S117), the 40 MHz wide 5 GHz band wireless communication is started using the channel (step S118) and the processing in step S105 is performed (this step may be omitted).

This sequence of operations allows the wireless communication to be switched from the millimeter wave band wireless communication to the 5 GHz band wireless communication using the 40 MHz wide channel. If it is found in step S117 that the radar wave is detected, the channel cannot be used and so a check is made if there is another free 40 MHz wide channel for which the radar wave detection processing is required (step S119). If there is such a free channel, control passed back to step S116 and the radar wave detection processing is performed for the channel. If there is no more such a channel in step S119, control is passed to step S120.

In step S120, a check is made if there is a free 20 MHz wide channel, for which radar wave detection is required, based on the scan result in step S114. If it is found in step S120 that there is no free 20 MHz wide channel (NO in step S120), the millimeter wave band wireless communication is continued without switching to the 5 GHz band wireless communication judging that there is no free channel in the 5 GHz band. If it is found in step S120 that there are free 20 MHz wide channels (YES in step S120), control is passed to step S121. In step S121, the radar wave detection processing is sequentially performed, one at a time, for the free 20 MHz wide channels detected in step S120. If no radar wave is detected on the channel as a result of the 60-second monitoring (NO in step S122), the 20 MHz wide 5 GHz band wireless communication is started using the channel (step S123) and the processing in step S105 described above is performed (this step may be omitted). This sequence of operations allows the communication to be switched from the millimeter wave band wireless communication to the 5 GHz band wireless communication using the 20 MHz wide channel.

If the radar wave is detected in step S122, the channel cannot be used and so a check is made if there is another free 20 MHz wide channel for which the radar wave detection processing is required (step S124). If there is such a channel, control is passed back to step S121 and the radar wave detection processing is performed for the channel.

If there is no such a channel in step S124, the millimeter wave band wireless communication is continued without switching to the 5 GHz band wireless communication judging that there is no more free channel in the 5 GHz band.

Note that, while the operation is performed according to the flowchart in FIG. 2, the reception control unit 24 regularly acquires the millimeter wave band reception quality value from the millimeter wave band reception unit 22 and, if the millimeter band reception quality value is increased and the reception status of the millimeter wave band wireless communication is improved, control is passed back to step S100 to continue the millimeter wave band wireless communication.

The operation in the flowchart in FIG. 2 described above allows the wireless communication to be automatically switched to the 5 GHz band wireless communication when the reception status of the millimeter wave band wireless communication is degraded. In this case, a 40 MHz wide channel, which has a transmission capacity larger than that of a 20 MHz wide channel, is selected by priority to minimize video and audio deterioration caused by a reduction in the information amount.

Because the channel search is performed first for the channels for which radar wave detection is not required, a free usable channel is found quickly. In addition, the channel search is performed also for the channels for which radar wave detection is required and, if there is a free 40 MHz wide channel in those channels and if the radar wave is not being transmitted on that channel, the wireless communication may be switched to the wireless communication using this 40 MHz wide channel.

<Second Embodiment>

The following describes the operation procedure for switching the wireless communication from the 5 GHz band wireless communication to the millimeter wave band wireless communication.

Figure 4:
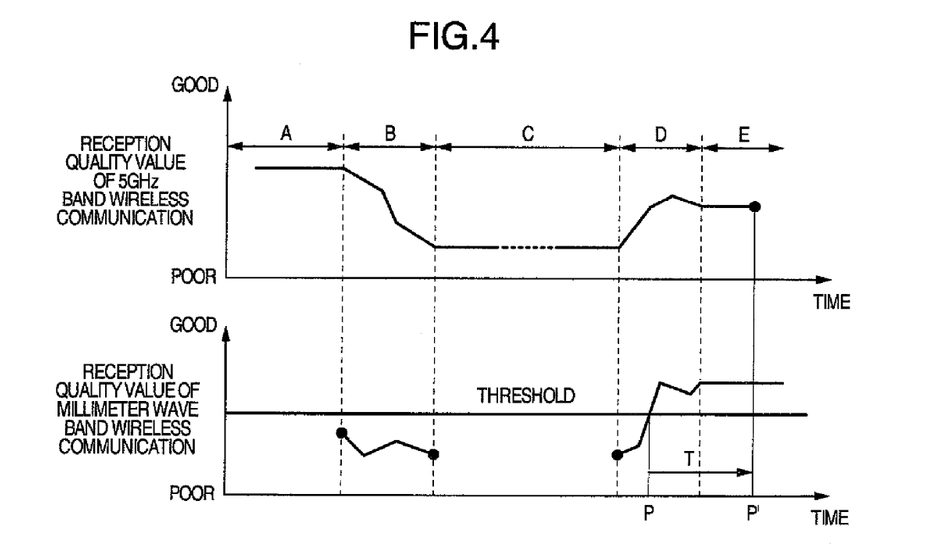
FIG. 4 is a diagram showing how the reception quality value of the 5 GHz band wireless communication and the millimeter wave band wireless communication changes over time.
Figure 5:
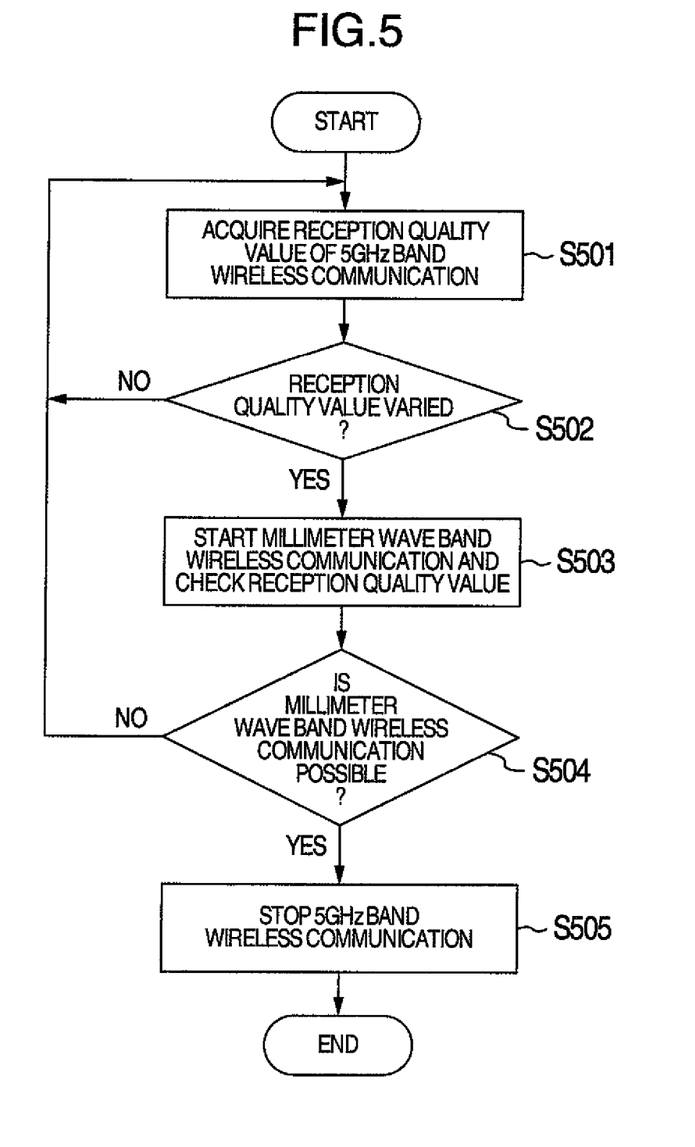
FIG. 5 is a flowchart showing an example of operation in which the 5 GHz band wireless communication is switched to the millimeter wave band wireless communication.

FIG. 4 is a diagram showing this operation and, in this figure, the reception quality value of the 5 GHz band wireless communication and the reception quality value of the millimeter wave band wireless communication are shown side by side to indicate how they change over time. FIG. 5 is a flowchart showing an example of operation for switching the wireless communication from the 5 GHz band wireless communication to the millimeter wave band wireless communication.

Referring to the flowchart in FIG. 5, the reception control unit 24 regularly acquires the reception quality value of the 5 GHz band wireless communication from the 5 GHz band reception unit 23 while the signal is transmitted and received via the 5 GHz band wireless communication (step S501). To reduce the power consumption, it is desirable to keep the operation of the millimeter wave band wireless communication from being started. A check is made if the acquired reception quality value is varied (step S502). No operation is performed if the reception quality value is not varied (sections A, C, and E in FIG. 4) but control is passed to step S503 if the reception quality value is varied (sections B and D in FIG. 4).

If the reception quality value of the 5 GHz band wireless communication is varied as described above, the wireless communication environment may have been changed, for example, the transmission device 10 or the reception device 20 has moved and, therefore, the reception status of the millimeter wave band wireless communication may be changed.

In step S503, the reception control unit 24 first transmits the control signal, which indicates that a variation in the reception quality value is detected, to the transmission control unit 14. In response to the control signal, the transmission control unit 14 causes the transmission selection unit 11 to transmit the received FID stream signal to both the 5 GHz band transmission unit 13 and the millimeter wave band transmission unit 12 and, at the same time, causes the millimeter wave band transmission unit 12 to start the operation for transmitting the HD stream signal via the millimeter wave band wireless communication. The reception control unit 24 causes the millimeter wave band reception unit 22 to start the operation for receiving the transmitted HD stream signal. And, the reception control unit 24 acquires the reception quality value of the millimeter wave band wireless communication. Next, in step S504, the reception control unit 24 compares the reception quality value of the millimeter wave band wireless communication with the predetermined threshold. If the reception quality value is smaller than the threshold (whole section B and section D before time P in FIG. 4), it is judged that the reception status of the millimeter wave band wireless communication is bad and that the signal cannot be transmitted or received and, in this case, control is passed back to step S501.

If the reception quality value is equal to or larger than the predetermined threshold (section D after time P in FIG. 4), control is passed to step S505 judging that the signal can be transmitted and received via the millimeter wave band wireless communication. In step S505, the reception control unit 24 causes the reception selection unit 21 to select the FID stream supplied from the millimeter wave band reception unit 22. In addition, the reception control unit 24 transmits the control signal, which indicates that the 5 GHz band wireless communication will be stopped, to the transmission control unit 14. In response to this control signal, the transmission control unit 14 causes the transmission selection unit 11 to stop supplying the HD stream signal to the 5 GHz band transmission unit 13. It is desirable that the transmission control unit 14 stop the operation of the 5 GHz band transmission unit 13 and that the reception control unit 24 stop the operation of the 5 GHz band reception unit 23. This sequence of operations allows the wireless communication to be switched from the 5 GHz band wireless communication to the millimeter wave band wireless communication.

In section B in FIG. 4, the reception quality of the 5 GHz band wireless communication is declining. In this case, the reception status of the millimeter wave band wireless communication is considered to be declining too. Therefore, when the reception quality value of the 5 GHz band wireless communication is declining, it is also possible not to pass control to step S503.

In the description above, control is passed to step S505 if, in step S504, the reception quality value of the millimeter wave band wireless communication is equal to or larger than the threshold. In this case, to switch the wireless communication after the reception status of the millimeter wave band wireless communication becomes more stable, it is also possible to pass control to step S505 when the reception quality value exceeds the threshold continuously for a predetermined period of time (period of time T from time P to time P' in FIG. 4) or when the moving average of the reception quality value becomes equal to or larger than the threshold.

As described above, the wireless communication may be switched at an appropriate time from the 5 GHz band wireless communication to the millimeter wave band wireless communication by checking the reception quality value of the millimeter wave band wireless communication when reception quality value of the 5 GHz band wireless communication is varied. In addition, the ability to keep the millimeter wave band wireless communication in the stopped state while the 5 GHz band wireless communication is being performed reduces the power consumption.

<Third Embodiment>

In the example of operation described in the second embodiment, the reception quality value of the millimeter wave band wireless communication is checked when the reception quality value of the 5 GHz band wireless communication is varied. The following describes another example of operation.

Figure 6:
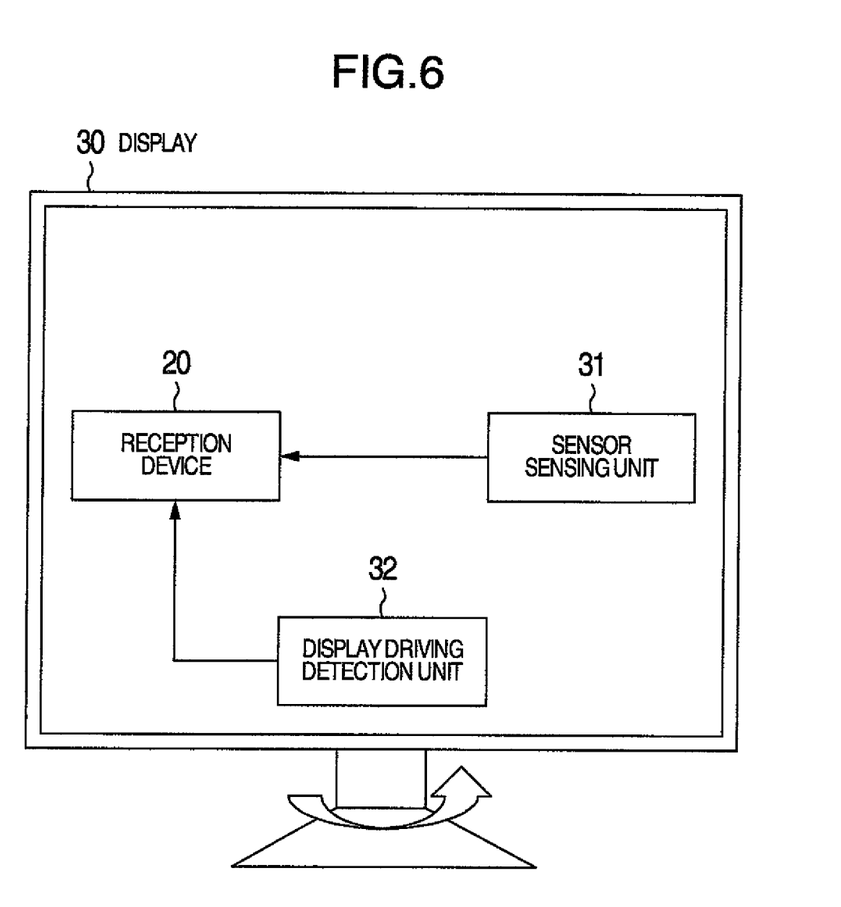
FIG. 6 is a block diagram showing the configuration of a wireless transceiver in a third embodiment of the present invention.

FIG. 6 is a block diagram showing the configuration of a wireless transceiver in a third embodiment of the present invention. As shown in FIG. 6, the reception device 20 described above, a sensor sensing unit 31, and a display driving detection unit 32 are fixed internally or externally in a display 30 on which an HD stream signal, received by the reception device 20, is displayed. The sensor sensing unit 31, which includes a sensor capable of sensing the movement of an object such as a gravity sensor or an accelerometer, can detect that the display 30 is moved, for example, by human hands. The display driving detection unit 32 can detect that the direction of the display is changed, for example, by the remote control operation by the user if the display 30 has the function for allowing the user to mechanically change its direction.

Figure 7:
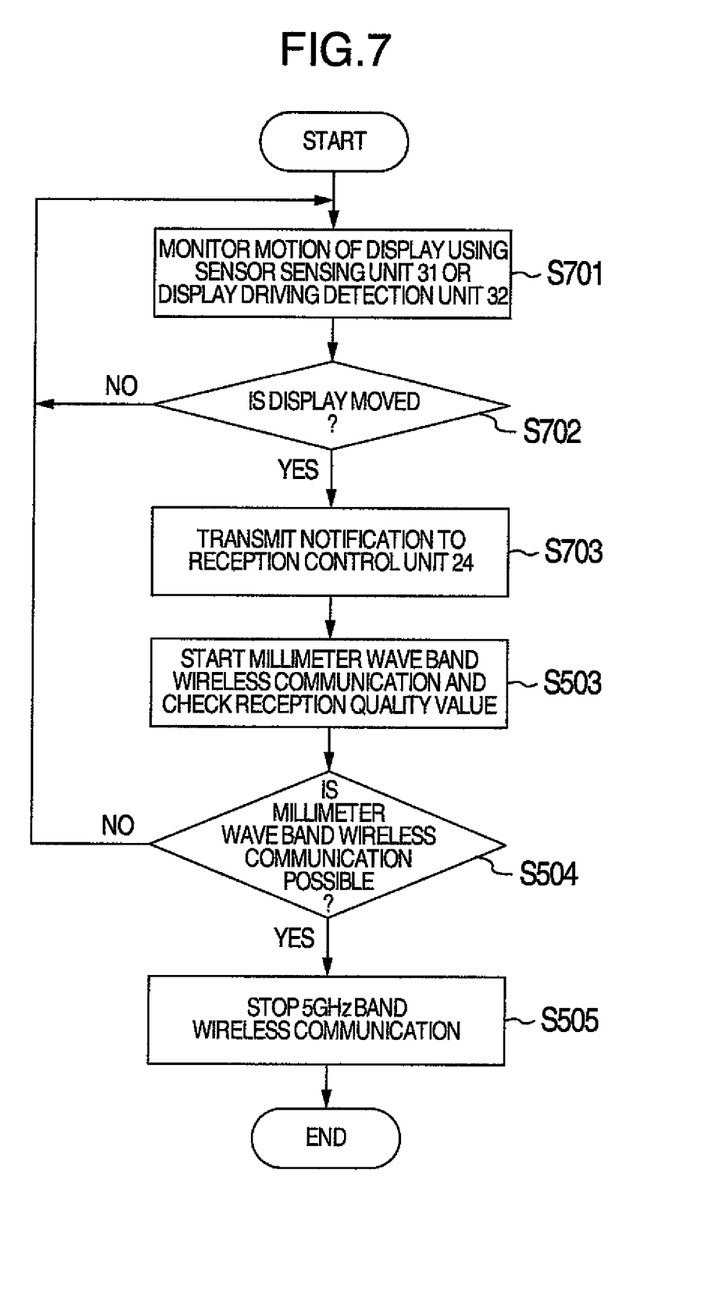
FIG. 7 is a flowchart showing an example of operation in which the 5 GHz band wireless communication is switched to the millimeter wave band wireless communication in the third embodiment of the present invention.

FIG. 7 is a flowchart showing an example of the operation in the third embodiment of the present invention for switching the wireless communication from the 5 GHz band wireless communication to the millimeter wave band wireless communication.

In step S701, the sensor sensing unit 31 or the display driving detection unit 32 monitors the movement of the display 30. And, upon detecting that the display 30 is moved (YES in step S702), the sensor sensing unit 31 or the display driving detection unit 32 transmits a notification to the reception control unit 24 (step S703). When this notification signal is received by the reception control unit 24, the subsequent operations (steps S503 to S505) are the same as those of the blocks having the same reference numerals as those of the corresponding blocks in the flowchart in FIG. 5. The description of those blocks is omitted here.

As described above, the wireless communication may be switched at an appropriate time from the 5 GHz band wireless communication to the millimeter wave band wireless communication as in the second embodiment.

Although, in the second and third embodiments, the operations in step S503 to S505 are performed when a predetermined condition is generated, a simpler method is also possible in which the operations of steps S503 to S505 are performed at a predetermined time interval (for example, at a 10-minute interval).

<Fourth Embodiment>

Although, in the description of the first embodiment to the third embodiment, various control information is transmitted between the transmission control unit 14 and the reception control unit 24 via the wireless communication at a predetermined frequency (for example, 2.4 GHz band that does not require a wireless station license or the frequency of 38 kHz used by an infrared remote control), control information may be transmitted also via the millimeter wave band wireless communication or the 5 GHz band wireless communication. The following describes how to implement this transmission.

The millimeter wave band transmission unit 12 and the 5 GHz band transmission unit 13, shown in FIG. 1, each have the function not only to transmit, but also to receive, signals via the millimeter wave band wireless communication and the 5 GHz band wireless communication. Similarly, the millimeter wave band reception unit 22 and the 5 GHz band reception unit 23 each have the function not only to receive, but also to transmit, signals via the millimeter wave band wireless communication and the 5 GHz band wireless communication. With these functions, the HDD stream signal is transmitted and received and, at the same time, the control information is transmitted and received, via the millimeter wave band wireless communication. In addition, the HD stream signal is transmitted and received and, at the same time, the control information is transmitted and received, via the 5 GHz band wireless communication. Only one of the wireless communication methods may be used to transmit and receive both the HD stream signal and the control signal for reducing the power consumption.

The following describes an example of the transmission of control information when the HD stream signal is transmitted and received via the millimeter wave band wireless communication.

Figure 8:
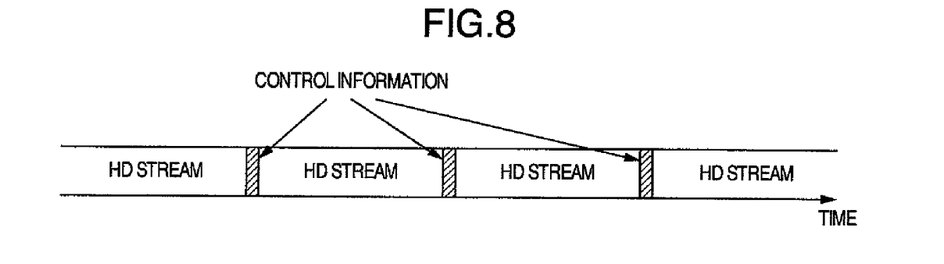
FIG. 8 is a diagram showing an example of the transmission of an HD stream signal and control information.

When the HD stream signal is transmitted and received via the millimeter wave band wireless communication, the transmission and reception of the HD stream is temporarily stopped for a short time at an interval of a predetermined time as shown in FIG. 8 and, during this interval, the control signal is transmitted and received.

Figure 9:
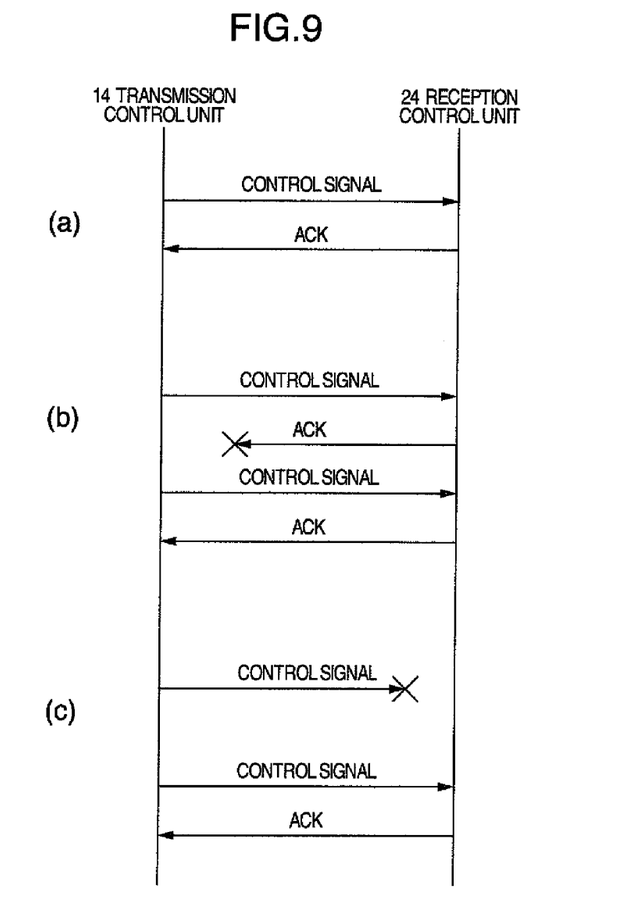
FIG. 9 is a flowchart showing the processing when control information is transmitted from a transmission control unit 14 to a reception control unit 24.

First, referring to FIG. 9, the following describes the transmission of control information from the transmission control unit 14 to the reception control unit 24. First, when the millimeter wave band transmission unit 12 stops the transmission of the HD stream signal, the transmission control unit 14 supplies control information to the millimeter wave band transmission unit 12 which, then, transmits the control information to the reception device 20. When the millimeter wave band reception unit 22 successfully receives the control information, the reception control unit 24 transmits the ACK (Acknowledgement) signal to the transmission device 10. By receiving the ACK signal, the transmission control unit 14 can recognize that the control information has arrived at the reception control unit 24 (sequence (a)). If the ACK signal cannot be received, the transmission control unit 14 transmits the control information again (sequence (b)). If the reception control unit 24 cannot receive the control information, the transmission control unit 14 transmits the control information again because the ACK signal cannot be received (sequence (c)). By performing this operation, the control information is transmitted from the transmission control unit 14 to the reception control unit 24.

Figure 10:
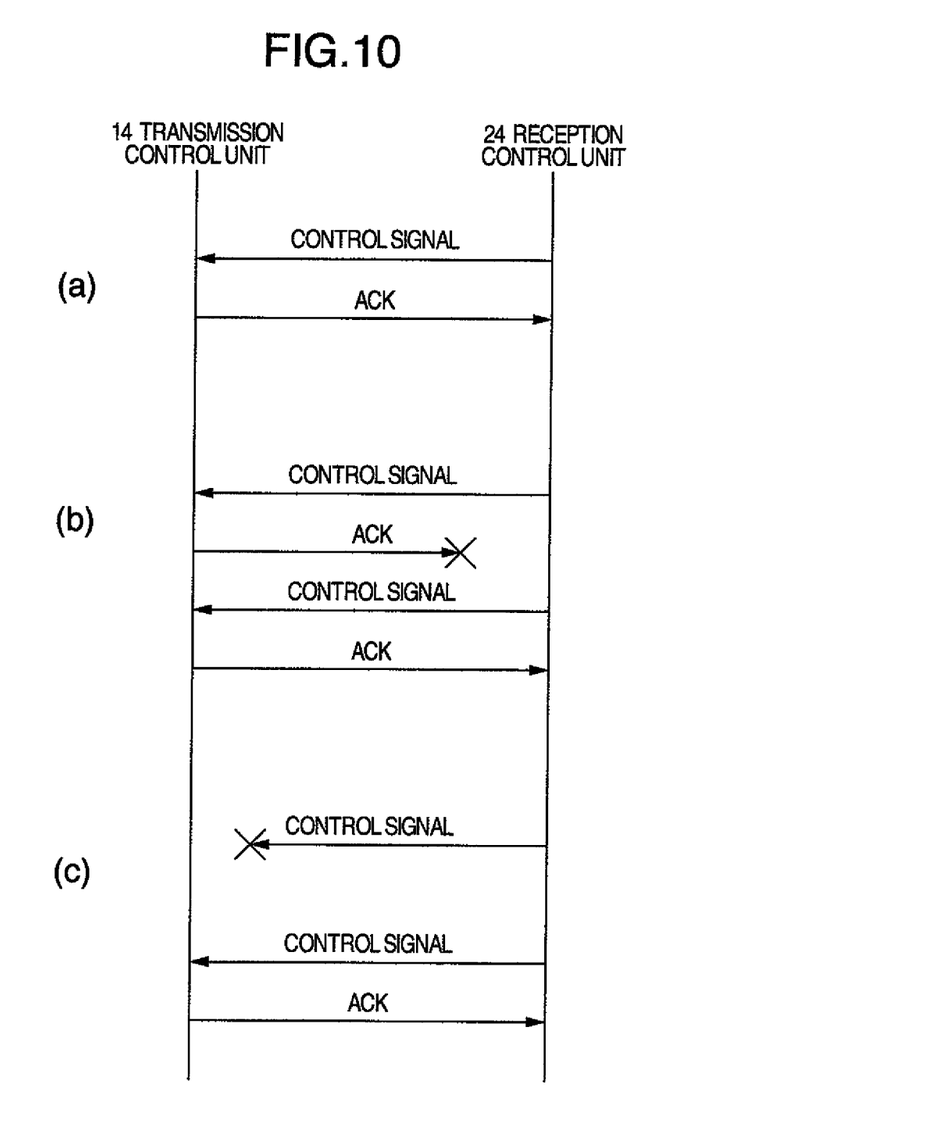
FIG. 10 is a flowchart showing the processing when control information is transmitted from the reception control unit 24 to the transmission control unit 14.

Next, referring to FIG. 10, the following describes the transmission of control information from the reception control unit 24 to the transmission control unit 14. First, when the millimeter wave band reception unit 22 stops the reception of the HD stream signal, the reception control unit 24 supplies control information to the millimeter wave band reception unit 22 which, then, transmits the control information to the transmission device 10. When the millimeter wave band transmission unit 12 can receive the control information, the transmission control unit 14 transmits the ACK signal to the reception device 20. By receiving the ACK signal, the reception control unit 24 can recognize that the control information has arrived at the transmission control unit 14 (sequence (a)).

If the ACK signal cannot be received, the reception control unit 24 transmits the control information again (sequence (b)). If the transmission control unit 14 cannot receive the control information, the reception control unit 24 transmits the control information again because the ACK signal cannot be received (sequence (c)). By performing this operation, the control information is transmitted from the reception control unit 24 to the transmission control unit 14.

An example of the transmission of control information when an HD stream signal is transmitted and received via the millimeter wave band wireless communication has been described above. In the above description, by replacing the millimeter wave band transmission unit 12 by the 5 GHz band transmission unit 13 and replacing the millimeter wave band reception unit 22 by the 5 GHz band reception unit 23, control information may be transmitted also via the 5 GHz band wireless communication.

Although the millimeter wave band wireless communication and the 5 GHz band wireless communication are used as the wireless communication method in the examples in the first embodiment to the fourth embodiment, the present invention is not limited to those wireless communications but is applicable to other wireless communication methods.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A transceiver comprising:
a transmission device that includes:
a first transmission unit that transmits video data in a first frequency band;
a second transmission unit that transmits video data over a second frequency bandwidth smaller in transmission capacity, and wider in transmission range, than the first frequency band; and
a transmission side control unit that controls said first and second transmission units, and
a reception device that includes:
a first reception unit that receives video data transmitted by said first transmission unit;
a second reception unit that receives video data transmitted by said second transmission unit; and
a reception side control unit that controls said first and second reception units wherein
if it is detected that a reception quality of video data received by said first reception unit is degraded below a predetermined threshold while video data is transmitted and received in the first frequency band, said reception side control unit notifies control information, which indicates the degradation, to said transmission side control unit,
said transmission side control unit detects a frequency bandwidth usable by said second transmission unit based on the control information which indicates the degradation and, when a usable frequency bandwidth is determined, causes said second transmission unit to transmit video data over the determined frequency bandwidth and, at the same time, notifies control information, which indicates the determined frequency bandwidth, to said reception side control unit, and
said reception side control unit causes said second reception unit to receive video data based on control information which indicates the determined frequency bandwidth.

2. The transceiver according to claim 1 wherein, if there are a plurality of frequency bandwidths usable by said second transmission unit and if at least two transmission capacities differ, said transmission side control unit determines a frequency bandwidth with a larger transmission capacity as a usable frequency bandwidth.

3. The transceiver according to claim 1 wherein
said transmission side control unit stops the transmission operation of said first transmission unit when causing said second transmission unit to transmit video data and said reception side control unit stops the reception operation of said first reception unit when causing said second reception unit to receive video data.

4. The transceiver according to claim 1 wherein
said transmission device further includes a transmission side transmission/reception unit that transmits and receives control information in a third frequency band different from the first frequency band and the second frequency band and
said reception device further includes a reception side transmission/reception unit that transmits and receives control information to and from said transmission side transmission/reception unit.

5. The transceiver according to claim 1 wherein
said first transmission unit further has a data reception function,
said first reception unit further has a data transmission function, and
control information indicating the degradation is transmitted and received by said transmission function and said reception function, and control information indicating the determined frequency bandwidth is transmitted and received by said first transmission unit and said first reception unit with the transmission and reception of video data temporarily stopped.

6. The transceiver according to claim 1 wherein
said second transmission unit further has a data reception function,
said second reception unit further has a data transmission function, and
control information indicating the degradation and control information indicating the determined frequency bandwidth are transmitted and received by said second transmission unit and said second reception unit.

7. A transceiver comprising:
a transmission device that includes:
a first transmission unit that transmits video data in a first frequency band;
a second transmission unit that transmits video data over a second frequency bandwidth smaller in transmission capacity, and wider in transmission range, than the first frequency band; and
a transmission side control unit that controls said first and second transmission units, and
a reception device that includes:
a first reception unit that receives video data transmitted by said first transmission unit;
a second reception unit that receives video data transmitted by said second transmission unit; and
a reception side control unit that controls said first and second reception units wherein
when video data is transmitted and received in the second frequency band and a predetermined condition is satisfied, said reception side control unit checks a reception quality of video data transmitted by said first transmission unit and received by said first reception unit and, if it is detected that the reception quality is improved to a predetermined threshold or higher, notifies control information to said transmission side control unit to stop the transmission by said second transmission unit and, at the same time, stops the reception of video data by said second reception unit, and said transmission side control unit stops the transmission of video data by said second transmission unit based on the notified control information.

8. The transceiver according to claim 7 wherein the predetermined condition is satisfied when said reception side control unit detects a change in the reception quality of video data received by said second reception unit.

9. The transceiver according to claim 7 wherein in a configuration in which said reception device is included in a display device, on which received video data is displayed, and is connected to a motion detection device, said motion detection device being included in said display device for detecting a motion of said display device, the predetermined condition is satisfied when said reception side control unit receives a notification, which indicates that said display device is moved, from said motion detection device.

10. The transceiver according to claim 9 wherein the predetermined condition is satisfied when a predetermined time has elapsed.

11. The transceiver according to claim 7 wherein said transmission device further includes a transmission side transmission/reception unit that transmits and receives control information in a third frequency band different from the first frequency band and the second frequency band and said reception device further includes a reception side transmission/reception unit that transmits and receives control information to and from said transmission side transmission/reception unit.

12. The transceiver according to claim 7 wherein said first transmission unit further has a data reception function, said first reception unit further has a data transmission function, and the control information is transmitted and received by said transmission function and said reception function.

13. The transceiver according to claim 7 wherein said second transmission unit further has a data reception function, said second reception unit further has a data transmission function, and the control information is transmitted and received by said transmission function and said reception function.

\* \* \* \* \*